Oct. 3, 1944.   I. J. SPAETH   2,359,394
BRAKE BEAM MOUNTING
Filed Nov. 13, 1942   2 Sheets-Sheet 1

INVENTOR,
IRVIN J. SPAETH
BY Rodney Bedell
ATTORNEY

Oct. 3, 1944.    I. J. SPAETH    2,359,394
BRAKE BEAM MOUNTING
Filed Nov. 13, 1942    2 Sheets-Sheet 2

INVENTOR;
IRVIN J. SPAETH
BY Rodney Bedell
ATTORNEY

Patented Oct. 3, 1944

2,359,394

UNITED STATES PATENT OFFICE 2,359,394

BRAKE BEAM MOUNTING

Irvin J. Spaeth, Chicago, Ill., assignor to Chicago Railway Equipment Company, Chicago, Ill., a corporation of Illinois Application November 13, 1942, Serial No. 465,403

13 Claims. (Cl. 188—209)

The invention relates to the mounting of railway brake beams, and more particularly to the construction of the brake beam hanger and the parts of the brake beam and of the support with which the hanger is associated.

The main object of the invention is to accommodate movement of the brake beam transversely of the truck relative to the truck frame or other truck member from which the beam is suspended, thus avoiding strain and wear upon the hanger and the parts to which it is connected. Such movement results from the longitudinal play of the wheels and axles in the journal boxes and from the play of the journal boxes in the truck frame pedestals. Obviously, if the beam, which is usually suspended from the frame, cannot move with the axle and wheels, the shoes will not be applied properly to the wheel tread and may be forced against the wheel flange or ride off of the edge of the wheel, or the head and hanger may be subjected to lateral thrusts, causing undue wear on the wheels, brake shoes, hangers and hanger bearings and tending to breakage of one or more parts.

The invention is particularly adapted for use with "box-type" hangers which include cross bars extending through recesses provided therefor in support brackets and in brake heads. It has been suggested that the movement of the beam transversely of the truck frame be accommodated by making the hangers of material which will yield under transverse thrust (H. A. Hoke Patent 1,166,521) or by providing a single link hanger with a ball-type enlargement at each end by which the hanger is supported and by which it is connected to the brake beam (C. K. Pickles Patent 817,871) and by pivoting the ends of the hanger legs to the ends of the cross bars (F. Schaefer Patent 1,709,907).

The present invention contemplates also the provision of a bushing between the hanger cross bar and the part (support bracket or brake head) with which the hanger is assembled, the bushing and cross bar being arranged to provide a restricted bearing intermediate the ends of the hanger providing free pivoting of the hanger about the axis of the cross bar to accommodate swinging of the hanger during application and release of the brakes, and providing limited tilting of the hanger and cross bar transversely of the pivoting movement of the hanger to accommodate the longitudinal movement of the beam relative to the support.

Another object is to provide for the free pivoting and limited tilting of the hanger as described without departing from the usual contours of the jaws in the support brackets and brake head, thereby rendering the device interchangeable with usual hanger structures.

These and other detail objects as will appear below are attained by the structure illustrated in the accompanying drawings, in which—

Figures 3, 4:
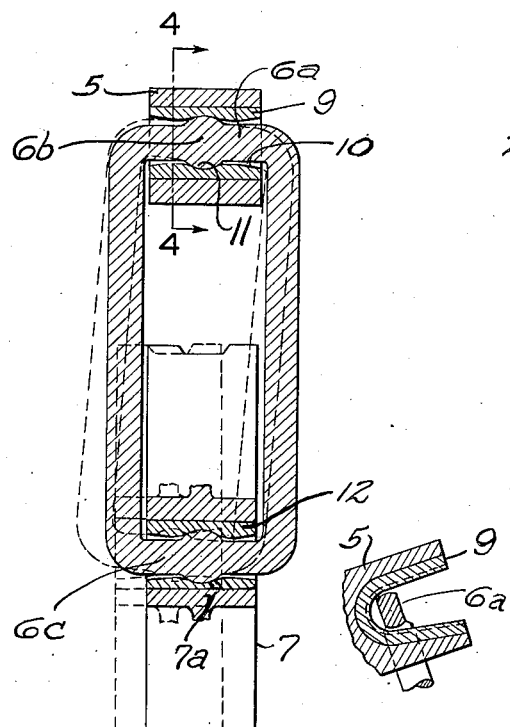
Figure 3 is a transverse vertical section through the hanger and associated structure taken approximately on the line 3—3 of Figure 2, the brake head being indicated diagrammatically.
Figure 4 is a detail section taken on the line 4—4 of Figure 3.
Figure 5:
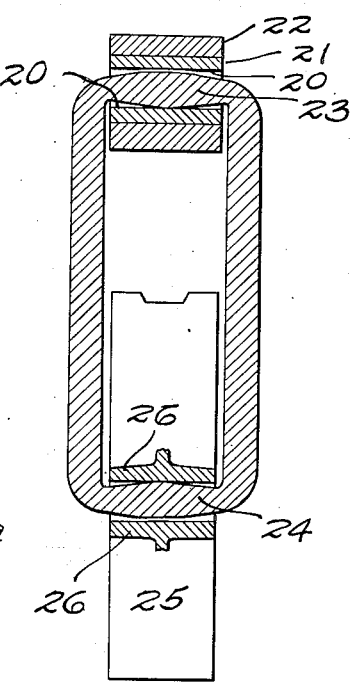
Figure 6:
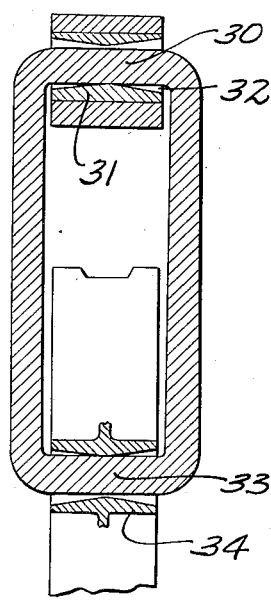
Figure 7:
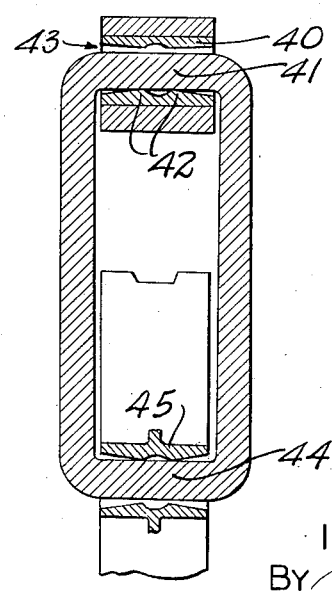

Figures 5, 6 and 7 correspond to Figure 3 but illustrate other forms of the invention.

The truck wheel 1 is mounted upon an axle 2 journalled in a box 3 which supports the truck frame 4 in the usual manner. The truck frame is provided with the usual brake hanger bracket 5 which comprises a C-shaped or U-shaped jaw opening longitudinally of the truck to receive the upper portion of a box-type hanger 6 by which the brake head 7, and corresponding end of the brake beam 8, is suspended. Preferably jaw 5 is fitted with a U-shaped bushing 9, the legs of which have flat exterior faces arranged to fit against the inner faces of the sides of the jaw. The inner face of each leg, and particularly the lower leg, is inclined from each side of the leg inwardly towards the middle of the leg, as indicated at 10 (Figure 3) to provide a limited bearing for the hanger cross bar 6a. The bearing may be provided with a rounded depression or groove, as indicated at 11, and the middle portion 6b of the cross bar may be increased in diameter and rounded to form a ball-like segment fitting in the bearing. With this arrangement, the opposing surfaces of the bushing and the hanger cross bar diverge from the intermediate portion of the cross bar to the ends thereof and provide for tilting of the hanger in one direction from the full line position shown in Figure 3 to the dotted line position shown to accommodate longitudinal movement of the beam relative to the truck frame. Obviously the hanger may tilt similarly in the opposite direction.

The hanger may pivot or swing freely about the axis of its cross bar to accommodate movement of the brake head and shoe to and from the wheels as the brakes are applied and released.

Figure 3 shows the upper leg of the bushing and the opposing surface of the hanger cross bar shaped similarly to the lower leg and opposing cross bar surface and fitting each other, but it will be understood this complementary structure is not essential to attain the desired result although it tends to hold the hanger against undue play in the bushing. The upper leg may clear the bushing without materially affecting the tilting of the hanger.

The support of the brake head by the lower cross bar 6c of the hanger corresponds to that provided for the support of the upper cross bar of the hanger on the frame bracket. Cross bar 6c is shaped like cross bar 6a. The hanger opposing surfaces of the brake head jaw 7a are fitted with a bushing 12 corresponding to bushing 9. This provides for the pivoting and tilting of the hanger and brake head on each other to accommodate movements of the beam as previously described.

Figure 5 illustrates another form of the invention in which the inner faces 20 of the legs of bushing 21 are substantially flat and parallel with the outer faces seated against the sides of jaw 22. The cross bar 23 is tapered from its middle portion of largest diameter towards its ends and, while there is restricted contact or bearing between the hanger cross bar and the bushing, the latter is not recessed or rounded longitudinally of the cross bar, as indicated in Figure 3. The connection between the hanger lower cross bar 24 and the brake head 25 corresponds to that indicated at the upper end of the cross bar except that the bushing is eliminated and the bulged central portion of the cross bar seats directly against the sides 26 of the brake head jaw.

Figure 6 illustrates another form of the invention in which the usual hanger construction is followed, the opposite sides of the upper cross bar 30 being substantially parallel from end to end of the cross bar and the inner faces of the legs 31 of the bushing being inclined from a point intermediate the ends of the cross bar to the sides of the legs so as to provide clearance 32 at the sides of the bearing accommodating pivoting of the hanger transversely of the general plane of its swinging movement during application and release of the brakes. The lower cross bar 33 is similarly journalled in the brake head jaw 34, the bushing being eliminated.

Figure 1:
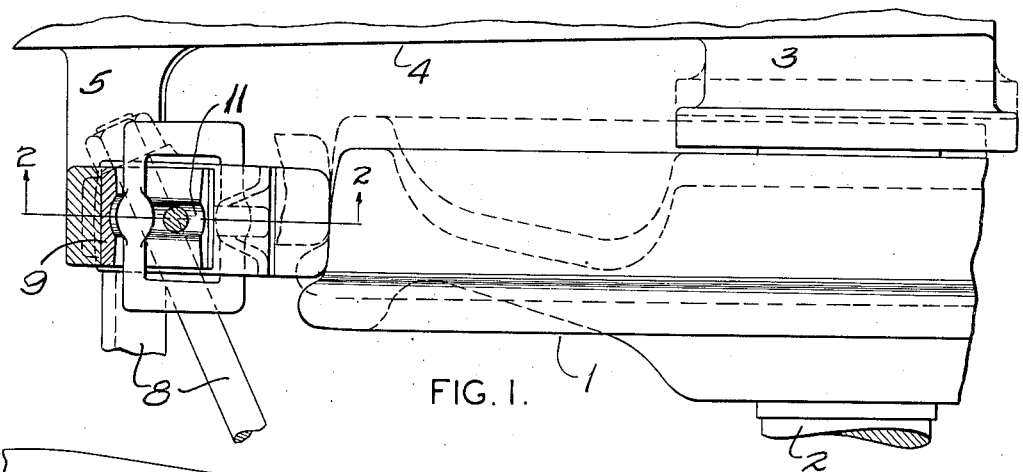
Figure 1 is a top view sectioned horizontally in part of a portion of a truck frame and wheel with a brake shoe applied thereto and supported from the brake frame.
Figure 2:
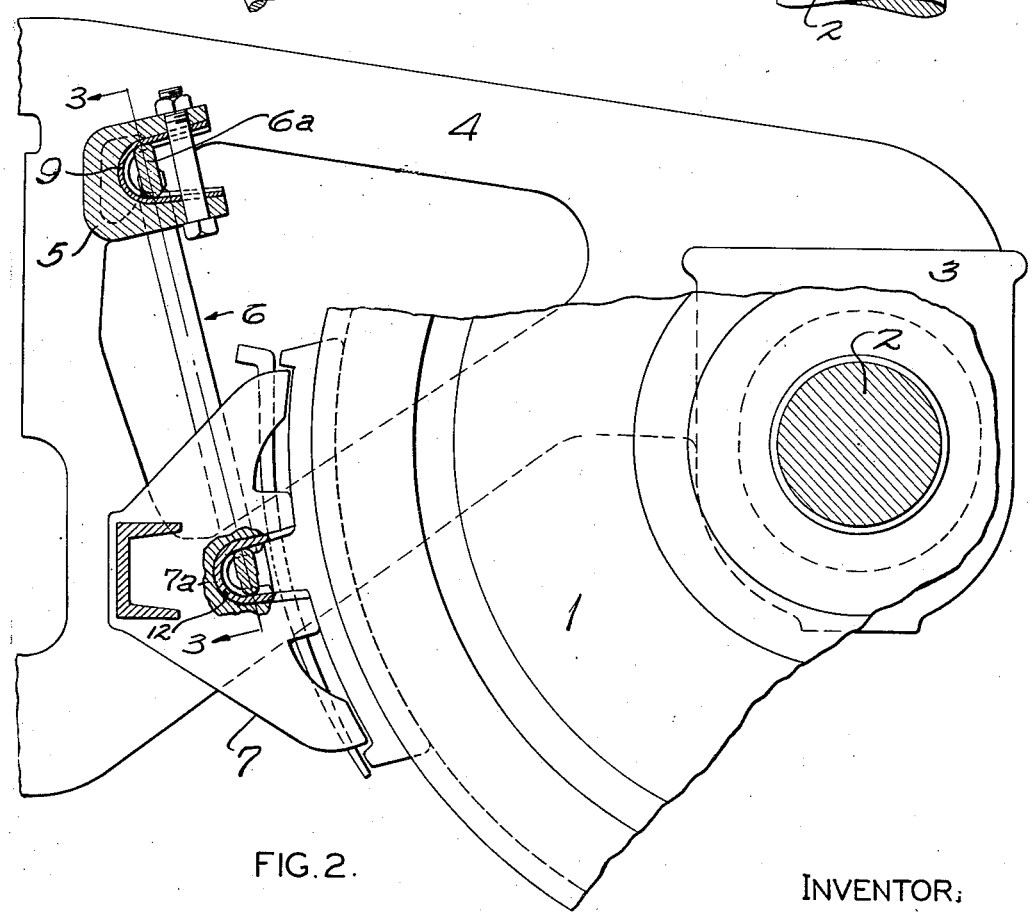
Figure 2 is a side elevation of the same structure sectioned in part along the line 2—2 of Figure 1.

Figure 7 illustrates another form of the invention in which the bushing 40 corresponds to the bushing 9 shown in Figures 1, 2 and 3 but the hanger cross bar 41 has its sides substantially straight and parallel, as shown in Figure 6. Accordingly, when the hanger swings about the axis of its cross bar during application and release of the brakes, it will be supported upon the spaced restricted bearing elements 42 and, when the hanger tilts transversely of the general plane of such movement, it will seat on one or the other of elements 42. With this arrangement, it will be necessary to provide clearance at 43 between the top of the cross bar and the opposing surface of the bushing to accommodate the upward movement of the adjacent portion of the cross bar as it tilts about one of the bearing elements 42. The lower cross bar 44 is similarly seated in the break head jaw 45.

In each form of the invention, the bushing may be used at either or both ends of the hanger to provide for renewal of the bearing surface at intervals to maintain relations between the parts.

The structures described above have the same general function as the structures described in an application filed of even date herewith by E. G. Busse, Serial No. 465,402, but attain that object by means of a restricted contact bearing intermediate the ends of the hanger cross bar and between the cross bar and the part it engages instead of by elongated bearing contacts between the hanger cross bar and the part which it engages, as shown in the E. G. Busse application, and the appended claims are to be so understood.

The details of the construction may be varied otherwise than as shown without departing from the spirit of the invention, and the exclusive use of such modifications as come within the scope of the claims is contemplated.

What is claimed is:

1. A brake beam mounting comprising a hanger having a cross bar member, a bushing member arranged for insertion between the cross bar member and an associated part and on which the hanger may pivot during application and release of the brakes, said members having opposing surfaces providing a restricted bearing-forming contact at the middle of the cross bar, said surfaces diverging from each other between the contact and the ends of the cross bar so that the hanger may tilt transversely of the general plane of its pivotal movement.

2. A brake beam mounting comprising a hanger having a cross bar member, a bushing member arranged for insertion between the cross bar member and an associated part and on which the hanger may pivot during application and release of the brakes, said members having opposing surfaces providing a restricted bearing-forming contact at the middle of the cross bar, and at least one of said surfaces being inclined away from the opposing surface between the contact and the ends of the cross bar member so that the hanger may tilt transversely of the general plane of its pivotal movement.

3. A brake beam mounting comprising a one-piece box-type hanger including a cross bar member, a bushing member open at one side to receive said cross bar and arranged for ready insertion into an associated part and on which the hanger may pivot during application and release of the brakes, said members having opposing surfaces providing a restricted bearing-forming contact at the middle of the cross bar, the surface of the cross bar member being inclined away from the surface of the bushing member between the contact and the ends of the cross bar member so that the hanger may tilt transversely of the general plane of its pivotal movement.

4. A brake beam mounting comprising a hanger having a cross bar member, a bushing member arranged for insertion between the cross bar member and an associated part and on which the hanger may pivot during application and release of the brakes, said members having opposing surfaces providing a restricted bearing-forming contact at the middle of the cross bar, the surface of the bushing member being inclined away from the surface of the cross bar member between the contact and the ends of the cross bar member so that the hanger may tilt transversely of the general plane of its pivotal movement.

5. In a railway brake beam mounting, a hanger having a cross bar about the axis of which the hanger has pivotal movement on an associated part during application and release of the brakes, said bar being enlarged in diameter between its ends to form a ball-like element on which the hanger may tilt on the associated part transversely of the general plane of said pivotal movement to accommodate lengthwise movement of the brake beam relative to the hanger support.

6. A brake beam mounting as described in claim 5 which includes a bushing member receiving the hanger cross bar and having an inner periphery recessed between its ends to fit about the ball-like element on the cross bar and form a bearing for the element, on which the hanger may swing and tilt as described, and clearing the remainder of the cross bar and having an exterior periphery substantially straight from end to end for fitting the inner face of a part with which the hanger may be assembled.

7. In a brake beam mounting, a U-shaped bushing constructed and arranged for insertion into an open jaw in a truck frame, the legs of the bushing being disposed substantially horizontally and the outer face of each leg being substantially flat to fit the sides of the jaw and the lower leg being thickened from the sides of the leg towards the middle of the leg to form a restricted bearing, and a hanger having a cross bar received in said bushing and supported on said bearing and pivoting freely thereon in one direction to accommodate application and release of the brakes and tilting thereon to a limited extent in a transverse direction to accommodate longitudinal shifting of the brake beam relative to the jaw.

8. In a brake beam mounting, a U-shaped bushing constructed and arranged for insertion into an open jaw in a truck frame, the legs of the bushing being disposed substantially horizontally and the inner face of the lower leg being substantially parallel to the outer face of the leg, and a hanger having a cross bar received in said bushing and enlarged in diameter intermediate its ends and thereby forming a relatively short element in contact with said leg, the enlargement being rounded to provide free pivoting of the hanger on the bushing leg in one direction to accommodate application and release of the brakes and to provide limited tilting of the hanger in a transverse direction to accommodate longitudinal shifting of the brake beam relative to the jaw.

9. In combination, a railway truck side frame having a brake hanger bracket, a box-type hanger suspended from said bracket, a brake beam carried by said hanger, the bracket and beam each being provided with a bushing member for seating the associated cross bar of the hanger and on which the associated cross bar may pivot during application and release of the brakes, the face of each bushing member seating the associated cross bar being inclined from its medial line towards its sides and away from the cross bar to provide a restricted bearing-forming contact near the middle of the cross bar about which the hanger may tilt transversely of the side frame to accommodate shifting of the brake beam transversely of the side frame.

10. In a railway brake beam mounting, a brake head having a recess extending inwardly from its shoe mounting face, there being a U-shaped bushing seated in said recess and arranged to receive the cross bar of a box-type hanger and to pivot thereon in a plane perpendicular to the beam, the faces of the legs of the bushing being inclined away from their medial line towards their sides to provide a restricted bearing-forming contact for the middle of the cross bar on which the head may tilt in a plane generally parallelling the shoe mounting face of the head to accommodate lengthwise shifting of the brake beam relative to the support from which the beam is suspended.

11. A brake beam mounting member comprising a U-shaped bushing constructed and arranged for insertion into a laterally opening supporting jaw in a truck frame, the legs of the bushing being disposed substantially horizontally and the outer face of each leg being substantially flat to fit the sides of the jaw and the inner face of the lower leg being thickened from the sides of the leg inwardly to form a restricted bearing at the center of the leg for the cross bar of a brake beam box-type hanger so that the latter may swing freely on the bearing in one direction to accommodate application and release of the brakes and may tilt on the bearing to a limited extent in a transverse direction to accommodate longitudinal shifting of the brake beam relative to the supporting jaw.

12. In a railway brake beam mounting, a brake head having a laterally opening U-shaped recess for receiving the cross bar of a one-piece box-type hanger, the upper face of said recess being inclined downwardly from the sides of the head inwardly to form a restricted bearing at the center of the recess for a hanger cross bar so that the beam may swing freely on the cross bar in one direction to accommodate application and release of the brakes and may tilt on the cross bar to a limited extent in a transverse direction to accommodate shifting of the brake beam longitudinally relative to the hanger support.

13. A mounting for a brake beam one-piece box-type hanger comprising a laterally opening jaw for receiving a hanger cross bar which is substantially straight from end to end, the inner face of one leg of the jaw comprising substantially plane surfaces inclined inwardly from the opposite sides of the jaw to form a restricted bearing at the center of the jaw for the hanger cross bar so that the hanger may pivot freely upon the bearing in one direction transversely of the length of the cross bar to accommodate application and release of the brakes and may tilt on the restricted bearing to a limited extent in a transverse direction and longitudinally of the cross bar to accommodate longitudinal shifting of the beam relative to the hanger support.

IRVIN J. SPAETH.